United States Patent [19]

Ericson

[11] 4,375,292
[45] Mar. 1, 1983

[54] TAKE-APART SEAL

[75] Inventor: Roger K. Ericson, Arlington Heights, Ill.

[73] Assignee: Rexnord Inc., Milwaukee, Wis.

[21] Appl. No.: 371,152

[22] Filed: Apr. 23, 1982

[51] Int. Cl.³ .............................................. F16J 15/34
[52] U.S. Cl. .................................... 277/81 R; 277/38; 277/192
[58] Field of Search .................. 277/81 R, 82, 38, 192

[56] References Cited

U.S. PATENT DOCUMENTS

| | | | |
|---|---|---|---|
| 2,504,937 | 4/1950 | Payne | 277/38 |
| 2,505,189 | 4/1950 | Krug | |
| 2,575,818 | 11/1951 | Kosatka | |
| 2,856,219 | 10/1958 | Kosatka | |
| 2,906,565 | 9/1959 | Scherba | 277/81 R |
| 3,367,666 | 2/1968 | Symons | |
| 3,410,566 | 11/1968 | Wiese | 277/81 R |
| 3,416,808 | 12/1968 | Voitik | |
| 3,672,689 | 6/1972 | Hadley | 277/38 |
| 3,917,287 | 11/1975 | Metcalfe | 277/38 |
| 4,183,396 | 1/1980 | Kinast et al. | |

Primary Examiner—Robert I. Smith
Attorney, Agent, or Firm—John M. Neary; Vance A. Smith

[57] ABSTRACT

A face seal assembly for preventing leakage of fluid around a rotating shaft of a machine, including a housing in the form of an annular U-shaped trough open at one end and closed at the other end. An annular seal element fits into the housing and is biased outwardly by a spring toward the open end into engagement with a mating ring. The seal element is held in the housing during assembly or servicing of the machine by two spring latch mechanisms which each include a formed spring fastened in a channel. The two spring mechanisms are welded to the inner face of the outer wall of the housing at diametrically opposed positions. The annular seal element has a notch in its outer circumferential wall on opposed diametrical sides to enable the seal element to fit snugly with the housing, with the channels received within the notches. The formed spring includes a spring finger on each end that projects circumferentially beyond the channel to engage the top of the seal element and hold it in the housing against the force of the biasing spring. The spring fingers can be flexed inwardly within the channel to clear the sides of the seal element groove to enable the element to be easily removed from the housing for inspection, repair, or replacement.

12 Claims, 6 Drawing Figures

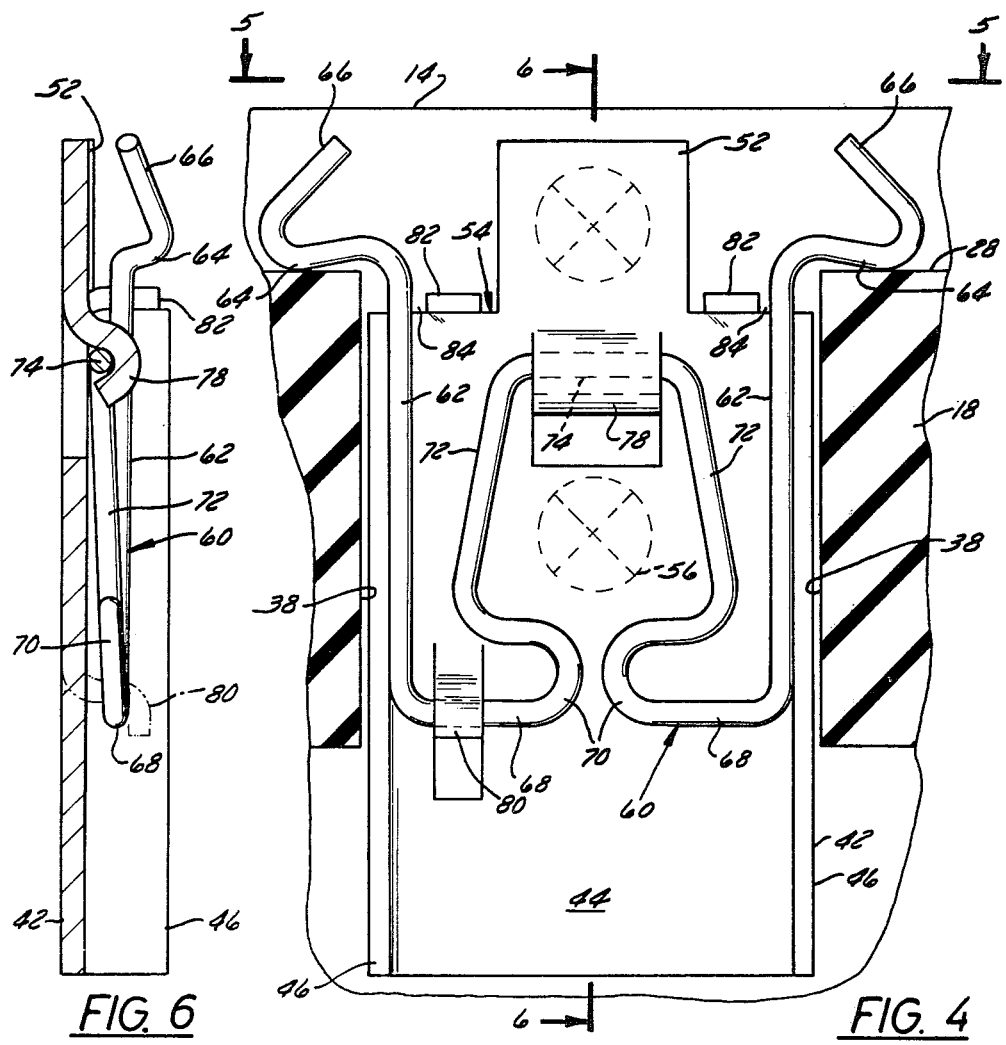

TAKE-APART SEAL

BACKGROUND OF THE INVENTION

This invention relates to a face seal for preventing fluid leakage past a rotating shaft, and more particularly to such a seal which can be disassembled for service and repair without removing the entire seal assembly from the machine.

Many powered or power driven machines have a rotating shaft projecting through a bore in the machine casing for transmission of power and require a shaft seal to prevent leakage of lunbricant or working fluid around the shaft through the bore in the casing. One of the most effective seals is a face seal.

A face seal has two seal elements: a nonrotating seal nose held within a seal housing seated in a counterbore in the machine casing, and a mating ring fixed to and rotating with the shaft. An essential characteristic of a proper seal is continuous full circumferential contact between the seal nose and the mating ring during all conditions of use. Continuous 360° contact requires two conditions. One is that the sealing surfaces on the seal nose and the mating ring be precise corresponding surfaces of revolution, preferably flat. The other condition is that the seal nose be flexibly mounted within its housing to enable it to follow the slight nutating motion of the mating ring on the shaft caused by slight misalignment of the mating ring on the shaft and slight misalignment of the shaft in its bearings.

The flatness of the seal nose and the mating ring is achieved by precision manufacturing techniques. The flexible mounting of the seal nose in the housing is accomplished by the use of a spring between the seal nose and the floor of the housing which biases the seal nose against the mating ring and allows the nutating motion as the seal nose follows the mating ring. An O-ring is disposed between the seal nose and the housing to prevent leakage of fluid through the housing around the seal nose.

When the machine is in operation, the mating ring holds the seal nose within the housing so there is no need for a mechanism to do this job. However, when the machine is being assembled, it is very desirable that the seal assembly be a single unit so that it can be inventoried and handled conveniently and so that there is no chance that the workers who assemble the machine itself assemble the seal improperly. Therefore, it is common practice to crimp or roll the top edge of the seal housing over a shoulder on the seal nose to hold the assembly together.

Permanent assembly techniques such as rolling or crimping the top edge of the seal housing over have two disadvantages. One is that the spring which urges the seal nose outwardly into contact with a mating ring tends to seal the seal nose against the rolled over flange on the seal housing to limit oil circulation and prevent oil from draining out of the seal housing when the machine is shut down. Puddles of oil which cannot drain from the seal housing can be heated to coking or varnish temperature by heat soak-back during the initial period after the machine is shut down and this varnish or coking of the oil can interfere with the free motion of the seal nose within the seal housing. The other disadvantage of a permanent assembly of the seal is that any inspection or repair of the seal assembly is rendered virtually impossible and requires instead the removal and replacement of the entire seal assembly.

Several prior art attempts have been made at providing a seal which can be disassembled for inspection and replacement of the spring, O-ring and seal nose. One technique uses a ring which fits into the seal housing and has two depending legs with radial projections which snap into diametrically opposed holes in the housing walls. This technique has the disadvantages that the external wall of the seal housing has a pair of holes through it which could cut the O-ring which is frequently used to seal the seal housing within the machine casing. In addition, this technique still requires the removal of the entire seal assembly in order to get access to the outside of the holes to disengage the projections on the legs of the retaining ring from the holes so that the retaining ring can be removed.

One other technique which has proven to be quite successful and is in wide use is the use of formed tangs on the antirotation channels which are fastened to the housing wall and lie in notches in the seal nose outer periphery. The tangs extend over the edge of the shoulder on the seal nose when the seal nose is inserted into the housing and rotated slightly so that one of the tangs extends over the edge of the notch. This technique works extremely well but does depend on the friction of the O-ring between the seal nose and to hold the seal nose in its locked position. Conceivably, during assembly operations of the machine the seal nose could become partially rotated within the housing and could be partially or completely released. Then when the shaft is assembled to the seal with the seal nose cocked or displaced from the seal housing, the seal nose could be broken or jammed into the housing in an inoperative position. This is an extremely unlikely condition, but in some situations it is worth the extra cost to provide a seal which eliminates even this remote possibility.

SUMMARY OF THE INVENTION

Accordingly, it is an object of this invention to provide a face seal, for preventing fluid leakage from within a machine casing around a rotating shaft, which is capable of disassembly for inspection and repair with or without removal of the entire seal assembly from the machine. It is another object of the invention to provide such a seal having secure means for holding the seal nose in place regardless of vibration or shock. Yet another object of the invention is to provide a seal of this nature which requires positive manipulative steps to unlatch the seal nose from the seal housing, but the steps may be made easily and quickly without tools and in such a manner as to lock the seal nose latch in unlatch position for ease of disassembly and reassembly. Still another object of the invention is to provide a seal of this nature that allows circulation and drainage of oil out of the seal housing. A further object of the invention is to provide a seal of this nature wherein the latch elements are restrained and damped to prevent fatigue failure of the latch elements due to vibration of the machine. Another still further object of the invention is to provide a seal of this nature wherein the latching mechanism also serves as an antirotation device for the seal nose and in which the seal housing presents a smooth uninterrupted exterior to prevent cutting the O-rings which seal the housing in the machine.

These and other objects of the invention are provided by a seal assembly having an annular trough-shaped housing containing a biasing spring and an annular seal element or nose urged out of the open end of the housing by the biasing spring. A latch device is fastened within the housing and includes a spring biased latch finger which extends over both edges of a notch in the seal nose to hold the seal nose within the housing. The latch fingers may be moved inwardly to clear the edge of the notch in the seal nose to allow the seal nose to slide out of the seal housing.

DESCRIPTION OF THE DRAWINGS

The invention and its many attendant objects and advantages may be better understood by reference to the following description of a preferred embodiment, when read in conjunction with the following drawings, wherein:

FIG. 4 is an elevation of the latch device which releasably holds the seal nose within the seal housing, along lines 4—4 in FIG. 3;

FIG. 5 is a plan view along lines 5—5 in FIG. 4; and

FIG. 6 is an edge elevation of the latch device along lines 6—6 in FIG. 4.

DESCRIPTION OF THE PREFERRED EMBODIMENT

Figure 1:
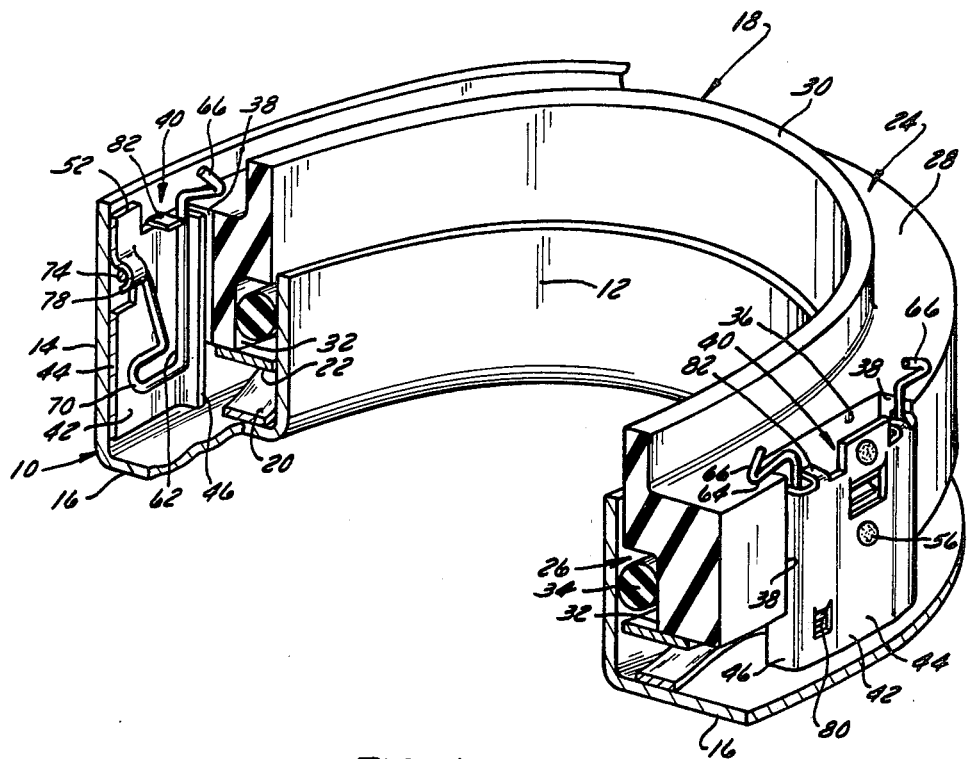
FIG. 1 is a partially sectional perspective view of a seal according to this invention.
Figure 3:
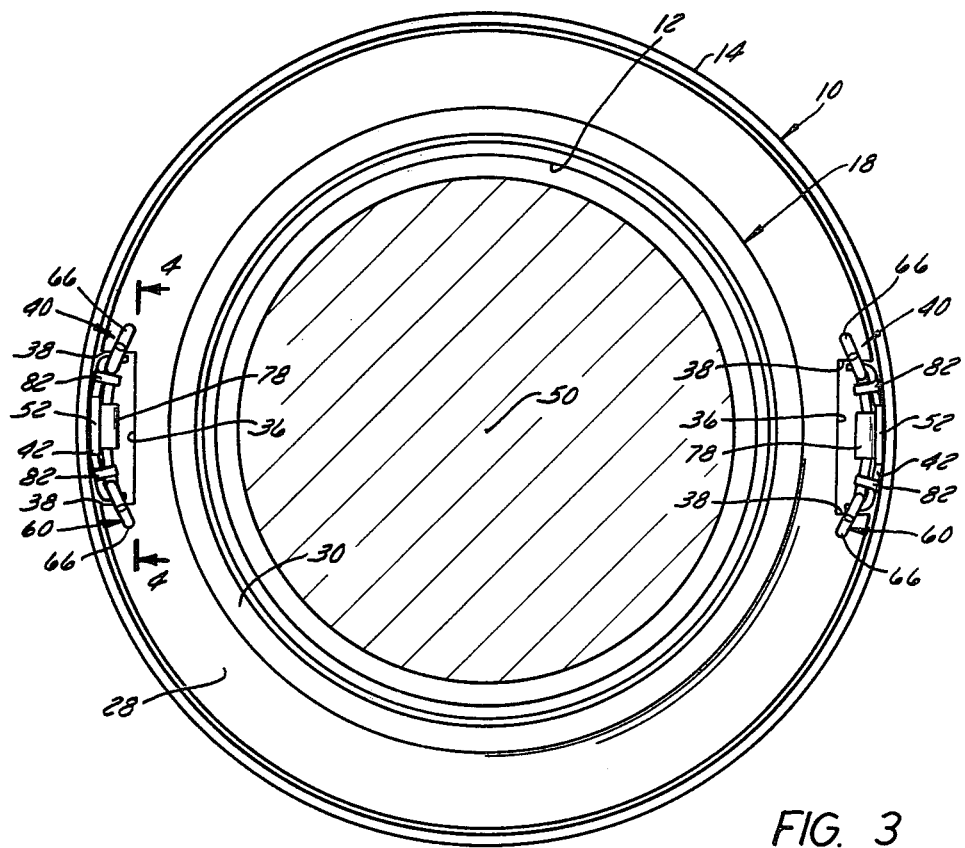
FIG. 3 is a plan view along lines 3—3 in FIG. 2.

Turning now to the drawings, wherein like reference characters designate identical parts, and more particularly to FIG. 1 thereof, a face seal assembly is shown having an annular trough-shaped housing 10 including an inner wall 12, an outer wall 14, and a floor 16 connecting the lower ends of the inner and outer walls. The seal can be oriented in any direction in the machine including downwardly, but for the purposes of clarity and ease of description, the orientation will be assumed to be that shown in the Figures, namely, with the open end of the housing facing upwardly. These orientation limited designations such as "top" and "bottom" are not to be given any limiting effect in the claims and are for the purpose of descriptive clarity of the preferred embodiment only.

An annular seal element or nose 18 slides axially into the open end of the housing 10. A spring 20 disposed between the bottom of the seal nose 18 and the floor 16 of the seal housing biases the seal nose 18 upwardly toward the open end of the housing 10. The spring 20 is a continuous annular spring having a wavy configuration of typically three or four lobes or waves. The spring 20 bears against a washer 22 which is sufficiently stiff to spread the biasing force of the spring 20 over a larger surface area and isolate the seal nose 18 from the scrubbing action of the spring as it flexes.

Figure 2:
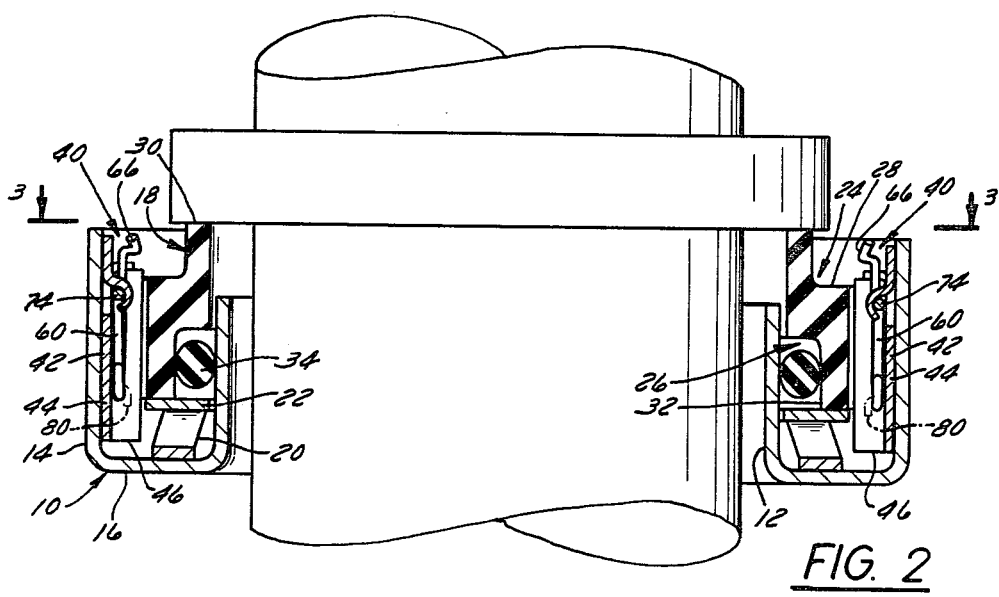
FIG. 2 is a sectional elevation of the seal in FIG. 1 shown installed in a machine in sealing engagement with a mating ring on a rotating shaft.

The seal nose 18 is of generally Z-shaped cross-section as shown in FIGS. 1 and 2. The Z-shaped form is a result of a cylindrical, annular recess 24 in the top outside corner of the seal nose element 18 and another cylindrical, annular recess 26 in the lower inside corner of the seal nose element 18. The top recess 24 provides an upwardly facing shoulder surface 28 which lies below the top sealing surface 30 of the seal element. The shoulder surface 28 is normally engaged by an inwardly rolled top end of the seal housing outer wall in permanently assembled seals. In this seal, the surface 28 is engaged by latch fingers of a latch device, to be explained below.

The lower inside recess 26 on the seal nose 18 provides a radially inwardly facing surface 32 which engages and compresses an O-ring 34 against the inner wall 12 of the housing 10 to provide a rolling seal between the seal nose 18 and the housing 10 to prevent leakage of oil or working fluid between the seal nose 18 and the housing 10 while allowing the seal nose to follow the nutation and other movement of the mating ring 35 fixed to the rotating shaft.

Two rectangular notches 36 are cut into the radially facing circumferential outside surfaces of the seal nose 18. The notches extend radially inward slightly less than half the width of the upwardly facing shoulder surface 28. The notches 36 provide clearance for the seal nose 18 around the latch devices described below, and provide circumferentially facing surfaces 38 which engage the edges of the latch devices to prevent the seal nose 18 from rotating in the housing.

The seal nose 18 is retained within the housing 10 by a pair of latch devices 40 shown in detail in FIGS. 4–6. Each latch device includes a shallow U-shaped channel 42 having a back plate 44 which is fastened to the inside face of the outer wall 14 and which includes a pair of radially inwardly extending flanges 46. The channels 42 are vertically oriented in the housing 10, that is, the lengthwise direction of the flanges 46 extends parallel to the axis 50 of the seal housing and the seal assembly. An integral tongue 52 projects beyond the top 54 of the channel and is attached, as by spot welding, to the inside of the outer wall 14 of the housing 10. The channel is also spot welded at a central area 56 to provide a secure attachment of the channel 44 to the seal housing 10.

A formed spring 60, fastened to the channel 44, provides the latching function. The spring 60 has two vertical legs 62 which lie along the flanges 46 and extend above the top 54 of the channel 42. The top end of each arm 62 is bent outwardly over the top of the channel flanges 46 to provide a latch finger 64 which engages the top shoulder surface 28 of the recess 24 on the seal nose 18. The terminal end of the latch finger 64 is bent back toward the channel 42 and slightly inwardly toward the axis 50 to provide an easily engaged handle 66 by which the latch end of the spring 60 may be manipulated.

The central portion of the formed spring 60 between the lower ends of the spring legs 62 is formed in the shaped of a truncated Christmas tree on a stand. That is, the bight ends of the spring legs 62 are bent inwardly to form a base portion 68. The inner ends of the base portions are bent back 180° on themselves to form the trunk portion 70 which is bent upwardly to form a pair of converging arms 72 connected at their top by an intermediate portion 74.

The spring 60 is held in the channel by a lug 78 that is sheared on three sides out of the back plate 44 of the channel 42 and bent down over the intermediate portion 74 of the spring 60 as clearly shown in FIG. 6 to hold the spring in place. An additional lug 80 may be provided at the bottom of the spring in the vicinity of the base 68 to prevent the lower end of the formed spring 60 from being bent outwardly by careless handling into engagement with the outwardly facing radial surface of the notch 36 in the seal nose 18. The additional lug 80 would not hold the spring tightly and therefore would allow the spring to flex in the vicinity of the trunk 70 for the purpose which will be explained below.

A pair of tabs 82 extends radially inward from the back plate 44 of the channel 42. A slot 84 is defined by the outer end of the tabs 82 and the inner top edge of the channel flanges 46. The slot 84 receives the top end of the spring leg 62 and restrains the amplitude of any vibration that the spring may experience to a very short stroke. In this way, the spring would not encounter significant stress in the event that the vibration of the machine in which the seal is mounted approaches the natural frequency of the spring. In addition, since the spring is held in contact with the channel 42, any vibration that does occur will be significantly damped by the rubbing friction between the spring and the channel 42 so that the vibration amplitude will remain insignificant. This is considered a prudent engineering objective to prevent fracture of the spring which could result in loose pieces that could damage the seal.

In any case, it is unlikely that the spring 60 could be excited to a resonant condition since the natural frequency of the spring is much higher than any vibration that an ordinary machine is likely to experience.

The flanges 46 of the channel 42 engage the circumferentially facing sides 38 of the notches 36 in the seal nose 18 to prevent the seal nose 18 from rotating in the housing 10. It is normal practice to use antirotation channels similar to the channel 42 for this purpose and therefore the added cost of the spring 60 and the lugs 78 and 80 provides a very minor cost increment to the seal as a whole. Indeed, the advantage provided by this invention is so significant that the minor cost differential will hardly be noticed.

In use, the mating ring 35 on the shaft depresses the seal nose 18 into the housing so that the seal nose is not actually in contact with the latch finger 64, and the flanges 46 do not present an edge to the face 38 in the notch 36 which could tend to wear a ledge into the seal nose 18. Such a ledge might otherwise tend to interfere with the necessary self-adjusting motion of the seal nose 18 in following some unusual motion of the mating ring 35.

The gap between the outer circumferential face of the seal nose 18 and the inner face of the outer wall 14 allows the oil to circulate through the seal in operation and to drain from the seal housing, which is normally installed in the casing counterbore with the axis 50 oriented horizontally. In this way, the oil can drain from the housing so that it does not turn to coke or varnish during the heat soak-back stage of the machine when it is first shut off.

It will be noted that the outer portion of the latch finger 64 is bent downwardly slightly more than the inner portion. This provides a more secure latching of the seal nose 18 in the housing by avoiding a camming action which would tend to occur if the latch finger were horizontal or bent slightly upward from the channel 42.

Obviously, numerous modifications and variations of the above-described preferred embodiment will occur to those skilled in the art upon reading this disclosure.

Accordingly, it is expressly to be understood that those modifications and variations, and the equivalents thereof, may be practiced while remaining within the spirit and scope of the invention as defined in the following claims, wherein I claim:

1. A face seal assembly adapted to be easily and quickly inspected and repaired, including an annular housing having two axially facing ends, one of which is open and the other of which is closed, said housing having inner and outer cylindrical walls terminating in free edges which define the opening at said open end, each of said walls being joined at the other axial end thereof to an annular floor connecting said walls; an annular sealing element in said housing; and a spring in said housing urging said sealing element toward said opening; wherein the improvement comprises:
   two releasable retention devices attached to said housing on diametrically opposed sides thereof, each device including
   a latch having an engaged position in which it extends into interfering engagement with said sealing element to hold said element within said housing, and a disengaged position in which it is retracted from said interfering engagement to permit said elememnt to move freely out of said housing through the open end thereof; and
   a spring for biasing said latch into said engaged position.

2. The face seal assembly defined in claim 1, wherein each said latch is integral with its biasing spring.

3. The face seal assembly defined in claim 1, wherein each said latch includes a latch finger which engages said seal element in said engaged position, and a latch handle for manipulating said latch when moving said latch finger between said engaged position and said disengaged position.

4. The face seal assembly defined in claim 3, wherein said latch finger and said latch handle are integral with said biasing spring.

5. The face seal assembly defined in claim 1, further comprising a channel fastened to the inside face of said outer wall, said channel having two circumferentially spaced flanges projecting radially inward and extending axially in said housing;
   said seal element has two notches formed in the outer surface thereof on opposite diametrical sides dimensioned to enable said seal element to be oriented with said notches aligned with said channels, and said seal element to be inserted into said housing with said channels received within said notches, said channel flanges being circumferentially opposed to the walls of said notches so as to prevent rotation of said seal element within said housing;
   said latch being mounted on said channel such that, in the engaged position, said latch projects beyond said channel into engagement with said seal element and, in the disengaged position, said latch is retracted within the confines of said channel.

6. The face seal assembly defined in claim 5, wherein each said latch is integral with its biasing spring.

7. The face seal assembly defined in claim 6, wherein said latch includes a formed spring having two leg portions disposed alongside said channel flanges, respectively, each leg having an integral latch finger that projects circumferentially beyond its respective flange in said engaged position.

8. The face seal assembly defined in claim 7, further comprising two radially projecting tabs on said channel, each disposed adjacent one of said flanges, respectively, and spaced circumferentially inwardly of said channel from said flange and defining therewith an inwardly opening radial notch in which said two leg portions lie, respectively;
   said tabs preventing circumferential movement of said latch from the engaged position to the disengaged position unless said leg portions are first moved radially inward a distance sufficient to clear said tabs.

9. The face seal assembly defined in claim 7, wherein said two leg portions are connected by a central portion; said formed spring being fastened to said channel at said central portion.

10. The face seal assembly defined in claim 9, wherein said central portion includes an inverted U-shaped portion having an intermediate portion and two depending arms connected to said leg portions, respectively, said U-shaped portion opening toward said closed end of said housing.

11. The face seal assembly defined in claim 10, wherein said formed spring is fastened to said channel at said intermediate portion.

12. The face seal assembly defined in claim 10, wherein said formed spring is fastened to said channel only by a lug that is stamped out of said channel and crimped back over said intermediate portion.

* * * * *